No. 862,273. PATENTED AUG. 6, 1907.
G. S. NEELEY.
VOLTAGE REGULATOR FOR DYNAMO ELECTRIC MACHINES.
APPLICATION FILED NOV. 30, 1906.

2 SHEETS—SHEET 1.

Witnesses:
Geo. R. Ladson.
A. J. McCauley.

Inventor,
George S. Neeley.
by Bakewell & Cornwall
Att'ys.

No. 862,273. PATENTED AUG. 6, 1907.
G. S. NEELEY.
VOLTAGE REGULATOR FOR DYNAMO ELECTRIC MACHINES.
APPLICATION FILED NOV. 30, 1906.

2 SHEETS—SHEET 2.

Witnesses
A. J. McCauley.
Geo. R. Larison.

Inventor:
George S. Neeley
by Bakewell & Cornwall
Att'y's.

UNITED STATES PATENT OFFICE.

GEORGE S. NEELEY, OF ST. LOUIS, MISSOURI.

VOLTAGE-REGULATOR FOR DYNAMO-ELECTRIC MACHINES.

No. 862,273.

Specification of Letters Patent.

Patented Aug. 6, 1907.

Application filed November 30, 1906. Serial No. 345,789.

*To all whom it may concern:*

Be it known that I, GEORGE S. NEELEY, a citizen of the United States, residing at the city of St. Louis, State of Missouri, have invented a certain new and useful Improvement in Voltage-Regulators for Dynamo-Electric Machines, of which the following is a full, clear, and exact description, such as will enable others skilled in the art to which it appertains to make and use the same, reference being had to the accompanying drawings, forming part of this specification, in which—

Figure 1:
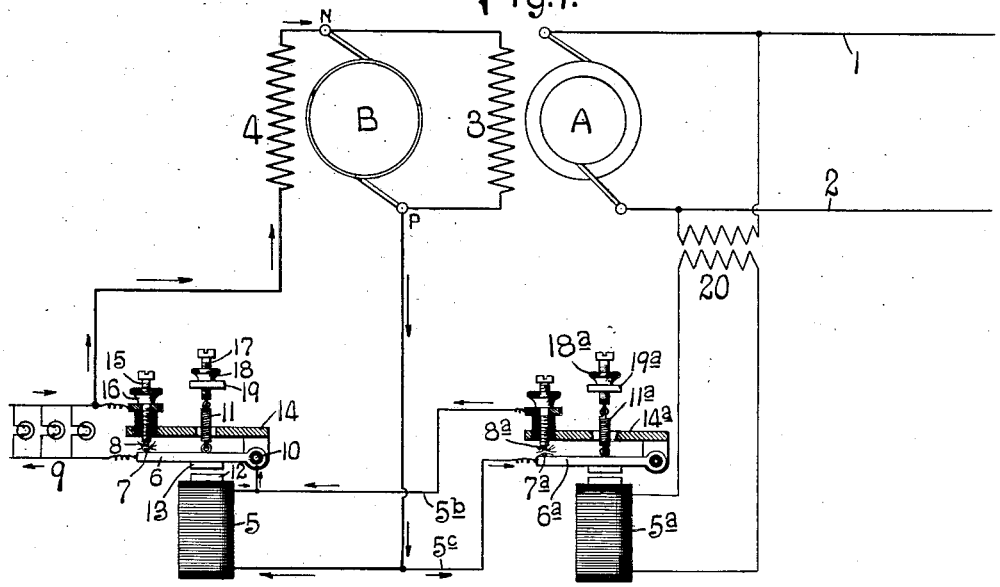
Figure 2:
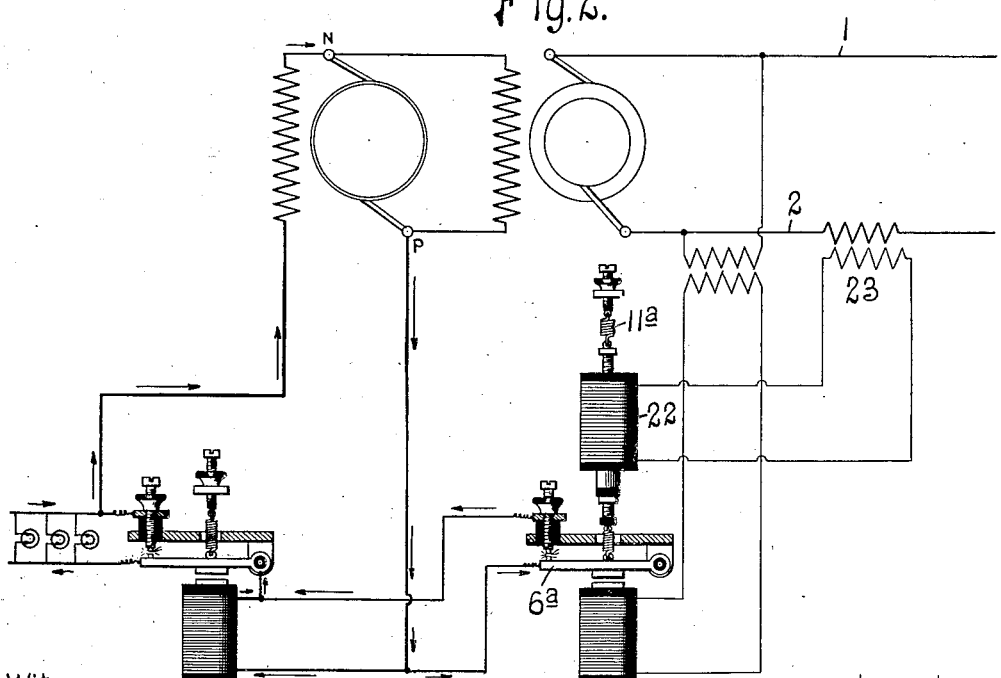
Figure 3:
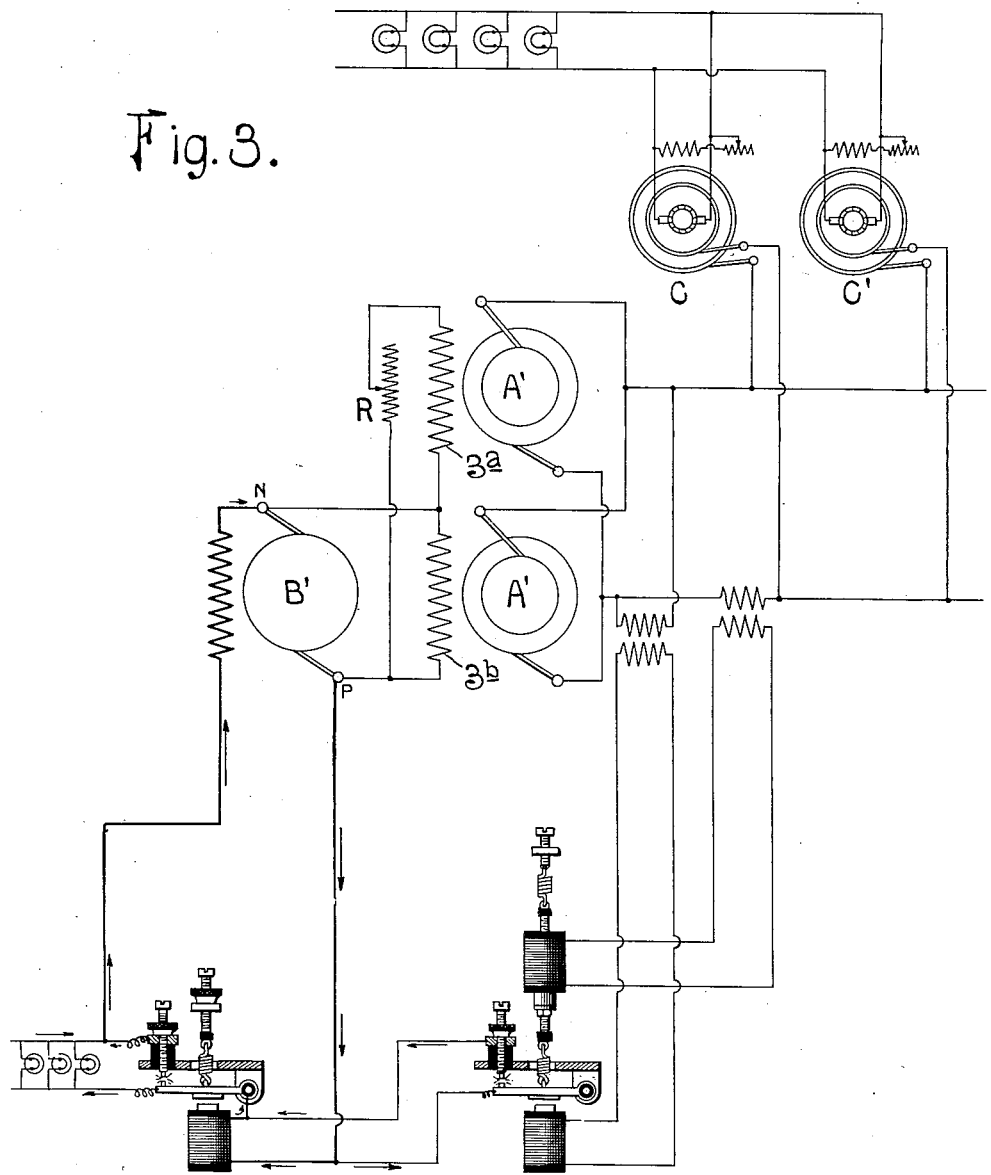

Figure 1 is a diagrammatic view illustrating a system involving my improved automatic voltage regulator for alternating current generators; Fig. 2 is a similar view showing a modified form of my improvement; Fig. 3 is a diagrammatic view illustrating the use of my improvement in a system where rotary transformers are employed;

This invention relates to new and useful improvements in automatic voltage regulators for alternating current generators, the object being to automatically maintain a constant voltage in the work circuit or system, regardless of the demands for current upon the working dynamo.

My present invention is designed especially as an improvement upon the system shown in an application for patent filed by me July 15, 1905, Serial No. 269,856.

In the accompanying drawings, A is an alternating current generator and B is its exciter.

1 and 2 are the primary mains extending from the generator A, and 3 is the field coil of said generator.

4 is the field winding of the exciter B. The arrow heads indicate the direction in which the exciter field current travels.

Starting from the positive brush P of the exciter, the field current passes through the winding of magnet 5 thence to the pivoted armature 6. Part of the current passes across the contacts 7 and 8, the former of which is carried by the pivoted armature, while the latter is a fixed adjustable contact, and the rest of the current passes through the resistances 9, preferably in the form of specially made incandescent lamps with a negative temperature coefficient, the two parts of the field current then joining and flowing through the field winding 4, thence to the negative brush N of the exciter, thus completing the field circuit.

Armature 6 is pivoted at 10 and is influenced in one direction by the spring 11 which tends to close the gap between the contacts 7 and 8. Magnet 5, when energized, tends to open the gap between said contacts 7 and 8. The influence of magnet 5 is augmented by the magnetic effort of the pole face 12, which attracts the iron "keeper" 13 mounted on the movable armature 6.

Contact 8 is stationarily mounted, but adjustable, in the stationary support 14. A contact-carrying screw 15 is held normally in position by the jam nut 16. The tension of spring 11 is made adjustable by the screw 17 and the jam nut 18 working in a stationary support 19.

When the contact 7 is in its extreme position away from the contact 8, the greatest resistance that can be offered to the field current of the exciter is set up in the field circuit of the exciter; and if the contact 7 should impinge against the stationary contact 8 the field circuit of the exciter would then contain no effective regulating resistance at all. All intermediate positions of the contact 7 between these extreme positions automatically create a proportional and effective regulating resistance in the form of an arc in the field circuit of the exciter, the value of which is varied when a change of current out-put occurs by changing the strength of the forces which act upon the armature 6.

The above described parts are similar to those shown and described in my former application Serial No. 269,856, and in operation, if we assume for the moment that all of the current passing from the positive brush of the exciter passes through the winding of magnet 5, and thence to the pivoted armature 6, it will be seen that, depending upon the strength of the magnet 5 tending to pull the armature 6 in one direction to separate contacts 7 and 8, in opposition to the tension of the spring 11, tending to pull said armature in the opposite direction, to close said contacts, the current will be divided, part of it passing through the contacts 7 and 8 and part through the resistance 9, depending upon which path offers the least resistance. In this manner the gap between the contacts 7 and 8 constitutes an automatic variable resistance in the field circuit of the exciter, around which the field current in said field circuit may be shunted through the resistance 9.

From the above it will be observed that the alternating current generator A has its field energized by the exciter B, and that the means for regulating the field resistance of the exciter consists of a variable resistance in series with the field of the exciter, which resistance is controlled by differential forces resulting from placing the intensity of the field current of the exciter in opposition to a yielding mechanical force, and supplying a shunt resistance 9 having a negative temperature co-efficient to relieve said variable resistance.

My present invention contemplates the employment of means for automatically maintaining a constant voltage in the work circuit or system regardless of the condition or demands for current upon the working dynamo, and consists essentially of a short-circuiting device, which, in addition to its short-circuiting capacity, also provides a shunt circuit having a variable resistance around the magnet 5, whereby the pull of said magnet 5 may be kept constant irrespective of the strength of the field current of the exciter B. It will be observed that as the field current of the exciter becomes stronger the tendency is to augment the pull of magnet 5, and to meet this condition in my said application No. 269,856, the spring 11 would have to be adjusted for each new load condition on the generator A, to preserve proper voltage in the work circuit at its normal value.

The short-circuiting device in my present construction consists of the following: A magnet $5^a$ is across the secondary winding of a potential transformer 20, the primary of which is across the mains 1 and 2. Attention is directed to the fact that the magnet 5 is influenced by the intensity of the exciter field current, while the magnet $5^a$ is influenced by the voltage across the mains 1 and 2. Magnet $5^a$ exerts a pull upon an armature $6^a$ carrying a movable contact $7^a$ which co-operates with an adjustable fixed contact $8^a$, the latter being mounted upon a stationary support $14^a$. A spring $11^a$ mounted in a stationary support $19^a$ and whose tension is adjustable, is connected to the armature $6^a$ and tends to close contacts $7^a$ and $8^a$, while the magnet $5^a$ tends to open said contacts. The contact point $8^a$ may be adjusted by providing means similar to those heretofore described in connection with the contact 8, and the tension of spring $11^a$ may be adjusted in a manner similar to the adjustment of the spring 11 heretofore described.

Wires $5^b$ and $5^c$ constitute a by-pass around the magnet 5 and connect respectively to a stationary contact $8^a$ and a movable contact $7^a$, so that when these contacts are closed magnet 5 is short-circuited, and when these contacts are in their extreme open position the resistance offered by the air gap in the form of an arc between the contacts $7^a$ and $8^a$ causes all of the field current to flow through the magnet 5. All excess in the exciter field current, beyond the initial minimum flow is thus automatically forced through or shunted around the winding of magnet 5 by the action of a magnet $5^a$ working against the tension of the spring $11^a$.

Assuming that the generator A and exciter B are running at normal speed, the operation of the above described parts is as follows: The tension of spring 11 is adjusted until the opposing pull of magnet 5 balances, we will say, at 98 volts, across the secondary terminals of the potential transformer 20, (it being desired to ultimately obtain a normal of 100 volts, the final adjustment should be made later), the voltage of the alternating mains 1 and 2 will be accurately maintained, as long as there is no change in the current output, because the incremental action of the exciter field current, traversing the winding of the magnet 5 tends to increase the resistance to its own flow, while the tension of spring 11 tends to decrease said resistance. The voltage of the alternating mains 1 and 2 now being such as to give 98 volts at the secondary terminals of the potential transformer 20, the tension of spring $11^a$ is adjusted until some of the field current traversing the winding of magnet 5 is diverted or shunted through the by-pass wires $5^b$ and $5^c$ and the contacts $7^a$ and $8^a$. This action causes magnet 5 to become weaker. As the tension of spring 11 continues constant after adjustment, it becomes stronger than the pull of magnet 5, and consequently the distance between the contacts 7 and 8 is shortened. This causes the exciter field current to increase its flow in the same inverted ratio as the distance between the contacts 7 and 8 is lessened, and the direct result will be that the voltage in the alternating mains 1 and 2 will be raised instantly, and when the 100-volt point is reached across the secondary of the transformer 20, the jam nut $18^a$ should be firmly tightened down to lock the adjusting devices of the spring $11^a$. As the generator A and exciter B are running at normal speed and the system has been adjusted to give a normal of 100 volts at the secondary terminals of the transformer 20, we will assume that it takes ¾ of an ampere of current in the exciter field winding 4 to excite up to the normal alternating current voltage, and, further, that ½ ampere is flowing through the winding of magnet 5 and the remaining ¼ ampere is flowing through the by-pass wires $5^b$ and $5^c$ and the contacts $7^a$ and $8^a$. Should there be an increase in the current output in the mains 1 and 2 under these conditions, the result will be a drop in the voltage in the mains 1 and 2, then the pull of magnet $5^a$ will be weakened in proportion. This action causes a momentary short-circuiting of the magnet 5 by the instantaneous closing of the gap between the contacts $7^a$ and $8^a$, resulting from the pull of the spring $11^a$. Spring 11 now acts to instantly shorten the distance between the contacts 7 and 8, which results in instantaneously increasing the field excitation until normal voltage is restored in the primary mains 1 and 2. When normal voltage is restored, magnet $5^a$ will prevent the voltage from rising above normal by removing the short circuit from around the magnet 5, by opening the gap between the contacts $7^a$ and $8^a$. When this occurs, the pull of magnet 5 is instantly increased and all abnormal movement of the contact 7 is instantly checked, until the resistance 9 becomes effective, when all of the parts will assume their normal steady condition as before. The field current of the exciter may now be 2 amperes, but 1½ amperes will be diverted through the wires $5^b$ and $5^c$ and contacts $7^a$ and $8^a$, while the original ½ ampere will still flow in the winding of magnet 5, causing its force or pull to be exactly what it was initially. The reverse action takes place when the load or current output is decreased on the mains 1 and 2. Under these conditions of decreasing load or current output the potential across the mains 1 and 2 will momentarily exceed normal, which results in magnet $5^a$ acting to separate the contacts $7^a$ and $8^a$, which would cause the full intensity of the exciter field current to be passed through the winding of magnet 5. Magnet 5 will instantly separate contacts 7 and 8 and the resistances 9 will be made effective in the field circuit of the exciter. These conditions tend to instantly reduce the field current of the exciter, and of course the voltage of the alternating current generator will be correspondingly reduced until normal voltage on the mains 1 and 2 is again reached. When normal voltage is reached, the tension of spring $11^a$ equals the pull of magnet $5^a$, at which time short-circuiting action of the contacts $7^a$ and $8^a$ again becomes effective.

From the above it will be seen that as soon as normal voltage has been reached either the action of spring $11^a$ or magnet $5^a$ predominates and becomes effective, causing more or less of the exciter field current to be passed through the winding of magnet 5 or diverted through the wires $5^b$ and $5^c$ and contacts $7^a$ and $8^a$.

In Fig. 2 I have illustrated the same system as is delineated in Fig. 1, but to which has been added a magnet 22 deriving its energy from the secondary of a series transformer 23. Magnet 22 is operated from the intensity of the current output and is employed to automatically supplement the action of the spring 11ᵃ in proportion to the current output. The object of this is to increase the voltage across the mains 1 and 2 to compensate for line losses. The results obtained from the magnetizing effect of the current upon the mains 1 and 2 is the same as if the tension of the spring 11ᵃ was manually increased proportional to the increase of current output, which action, as before explained, increases the alternating current voltage; and likewise, the action is the same as if the tension of the spring 11ᵃ was manually decreased proportional to the load decrease.

By the use of the magnet 22 in Fig. 2 the action is absolutely accurate and automatic for all extreme and intermediate conditions of load increase or decrease. It might be well to state that magnet 22 is a solenoid magnet whose core forms part of a connecting medium between the spring 11ᵃ and the armature 6ᵃ.

The advantages of my improved system are many, chief among which may be mentioned the fact that the controlling elements are operated almost wholly by electro-mechanical forces which render the system very positive and sensitive in its action, causing the deliverance of a very steady voltage on the supply wires without the use of dash pots. There is no sparking at the contact points, and hence there is no need for condensers and differential windings on the magnets for the purpose of suppressing arcing at the contacts.

In Fig. 3 I have illustrated a diagrammatic view of a complete system wherein a plurality of alternating current generators A′ are supplying current in common to a plurality of rotary converters C and C′. The exciter B′ supplies exciting current in common to the generators A′. The rheostat R is for the purpose of initially adjusting the resistance in the field winding 3ᵃ equal to that of the field winding 3ᵇ, so that each generator will deliver its prorata of the total current to the rotary transformers C and C′. The regulating system shown in Fig. 3 is identical with that illustrated in Fig. 2 and for that reason it will be unnecessary to repeat the description here of what has been said with reference to said Fig. 2.

While I have described my improvement as being expressly applicable to alternating current systems where the generators are separately excited, it is obvious that my improvement is also applicable to direct current systems, and with slight modifications may be employed in connection with self-excited generators.

Having thus described the invention, what is claimed as new and desired to be secured by Letters Patent is:

1. The improvement in the art of regulating an alternating current generator, the field of which is energized by an exciter, the same comprising means for regulating the field resistance of the exciter in response to differential electro-mechanical forces resulting from placing the intensity of the field current of the exciter in opposition to a mechanically yielding force, and means for varying the force derived from the intensity of the field current of the exciter; substantially as described.

2. The improvement in the art of regulating the field of an alternating current generator, the field of which is energized by an exciter, comprising a variable resistance in series with the field of the exciter, and means for controlling the said variable resistance in response to differential forces resulting from placing the intensity of the field current of the exciter in opposition to a mechanically yielding force, supplying a resistance connected in shunt to said variable resistance, and means for regulating the force derived from the intensity of the field current of the exciter; substantially as described.

3. The improvement in the art of regulating an alternating current generator, the field of which is energized by an exciter, comprising means for regulating the field resistance of the exciter in response to differential electro-mechanical forces resulting from the intensity of the field current of the exciter working in opposition to a mechanically yielding force, and supplementary means whereby the current output of the said alternating current generator magnetically assists the action of the said mechanically yielding force by increasing the voltage of the said alternator proportional to the increasing current output, to compensate for line losses; substantially as described.

4. The improvement in the art of regulating the field of an alternating current generator, the field of which is energized by an exciter, comprising a variable resistance in the field circuit of the exciter, means for controlling the effectiveness of the said variable resistance by differential electro-mechanical forces resulting from the electro-magnetic opposition of the intensity of the field current of the exciter against an equal mechanical force, supplementary electro-mechanical means whereby the voltage of the current output of the said alternating current generator is made to magnetically regulate the magnetic action obtained from the intensity of the field current of the exciter by varying the force derived from the intensity of the field current of the exciter, and shunt resistances having negative temperature coefficiencies to relieve the said variable resistance; substantially as described.

5. The combination of an alternator, an exciter therefor, means for regulating the field resistance of the exciter in response to differential electro-mechanical forces resulting from the intensity of the exciter field current working in electro-magnetic opposition to the force of a spring, and means for varying the force derived from the intensity of the field current of the exciter proportional to the voltage of the said alternator; substantially as described.

6. The combination of an alternator and its exciter, a variable resistance in series with the field of the exciter, the said resistance being responsive to the action of a magnet, and an elastic force, the said magnet being in circuit with the exciter field, the said elastic force being arranged in mechanical opposition to the force of said magnet, electro-mechanical means for causing the said magnet to be short-circuited by the voltage of the said alternator, and means for manually adjusting the force derived from the intensity of the field current of the exciter; substantially as described.

7. The combination with means for regulating the resistance in the field circuit of the exciter of an alternating current generator, said means including a magnet in series with the field of the exciter, of a shunt containing a variable resistance around said magnet, and means for regulating the force of said magnet; substantially as described.

8. The combination with means for regulating the resistance in the field circuit of the exciter of an alternating current generator, said means including a magnet in series with the field of the exciter, of a shunt containing a variable resistance around said magnet, and electro-magnetic means energized by the voltage and current output of the generator for varying said last mentioned resistance; substantially as described.

9. The combination with means for regulating the resistance in the field circuit of the exciter of an alternating current generator, said means including a magnet in series with the field of the exciter, of a shunt containing a variable resistance around said magnet, electro-magnetic means for increasing said variable resistance, and mechanical means in opposition to the pull of the electro-magnetic means for decreasing said variable resistance; substantially as described.

10. The combination with means for regulating the resistance in the field circuit of the exciter of an alternating current generator, said means including a magnet in series with the field of the exciter, of a shunt containing a variable resistance around said magnet, and a magnet energized by the potential of the current output of the generator for varying said last mentioned resistance; substantially as described.

11. The combination with means for regulating the resistance in the field circuit of the exciter of an alternating current generator, said means including a magnet in series with the field of the exciter, of a shunt containing a variable resistance around said magnet, and electrically operated means for increasing said variable resistance, electromechanically operated means in opposition to said electrically operated means for decreasing the said variable resistance; substantially as described.

12. The combination with a magnet in series with the field of the exciter of an alternating current generator, and operable to regulate the resistance in said circuit, of electro-magnetic means energized by the work circuit of the system for short-circuiting said magnet; substantially as described.

13. The combination with a magnet in series with the field of the exciter of an alternating current generator, and operable to regulate the resistance in said circuit, of means energized by the work circuit of the system for regulating the effectiveness of the pull of said magnet; substantially as described.

14. The combination with a magnet in series with the field of the exciter of an alternating current generator, and operable to regulate the resistance in said exciter field circuit, of a magnet energized by the work circuit of the system for regulating the effectiveness of said last mentioned magnet, a yielding mechanical force in opposition to said magnet, and a magnet energized by the current output of the said alternating current generator for assisting said yielding mechanical force; substantially as described.

15. In a field regulator for dynamo electric machines, the combination with a variable resistance in the field circuit of the generator, means for varying said variable resistance in response to differential electro-mechanical forces resulting from placing the intensity of the field current of the exciter in opposition to a mechanically yielding force and a shunt around said variable resistance, said shunt having a resistance whose temperature coefficient is negative; substantially as described.

16. In a field regulator for dynamo electric machines, the combination of a field magnet winding, a magnet in series therewith, an electric arc in series with the magnet, one of the terminals of said arc being movable and under the control of said magnet, means operating in opposition to said magnet and also upon said movable terminal, mechanical means for adjusting the effectiveness of the magnet upon said movable terminal, and a shunt around said arc, the resistance in said arc having a negative temperature coefficient; substantially as described.

17. The improvement in the art of regulating an alternating current generator, the field of which is energized by an exciter, comprising means for regulating the field resistance of an exciter in response to differential forces, one of which forces is electro-magnetic and derived from the field current of the exciter, and the other of which forces is mechanical and opposed to said electro-magnetic force; substantially as described.

18. The improvement in the art of regulating the field of a dynamo electric machine comprising, in combination, a voltage controlling circuit for the said dynamo, a variable resistance in said circuit, a magent in series with said circuit, mechanical means exerting a force for counteracting the force of said magnet, manually adjustable means for adjusting the effectiveness of said variable resistance, and a shunt circuit around the said variable resistance; substantially as described.

19. In a field regulator for an electric generator, the combination with a voltage controlling circuit, of a magnet in series with said circuit, a mechanical means exerting a yielding force in opposition to said magnet, and auxiliary means for varying the force of said magnet in response to the voltage of said generator; substantially as described.

20. In a field regulator for electric generators, the combination with a regulating resistance and a magnet in series with the field of said generator, opposing means for said magnet, automatic means for varying the force of said magnet in response to the voltage of said generator, and a resistance connected as a shunt to said regulating resistance; substantially as described.

21. A regulator for a separately-excited electric generator comprising the following elements in combination: a variable resistance and a main controlling magnet in series with the field of the exciter; mechanical means operating in opposition to said main magnet; and an auxiliary magnet for automatically varying the force of said main magnet in response to the voltage of the said generator; substantially as described.

22. A voltage regulator for a dynamo whose field is energized by an exciter, the same comprising the following elements in combination: An automatic variable resistance and a controlling magnet in series with the field of the exciter; means for maintaining a periodic short-circuit around the winding of said controlling magnet, electromagnetic means energized by the voltage of the dynamo for rendering said last-mentioned means ineffective; and a carbon resistance connected as a shunt to said variable resistance; substantially as described.

23. The combination with an electric generator, its exciter, and the work circuit, of a resistance in the field circuit of the exciter, a magnet for regulating said resistance, differential coils affected respectively by current and voltage fluctuations of the work circuit, for controlling said first-mentioned magnet; substantially as described.

24. The combination with an electric generator, its exciter and the work circuit, of a resistance in the field circuit of the exciter, a magnet for controlling said resistance, differential coils affected respectively by voltage and current fluctuations in said circuit, whereby, under certain conditions, a short circuit is made around the winding of said first-mentioned magnet, and a shunt circuit around said variable resistance; substantially as described.

In testimony whereof I hereunto affix my signature in the presence of two witnesses, this twenty sixth day of November 1906.

GEORGE S. NEELEY.

Witnesses:
F. R. CORNWALL,
LENORE WILSON.